No. 637,415. Patented Nov. 21, 1899.
G. RAGOT & T. BERLIZE.
BOTTLE OR OTHER VESSEL.
(Application filed Dec. 19, 1898.)
(No Model.)
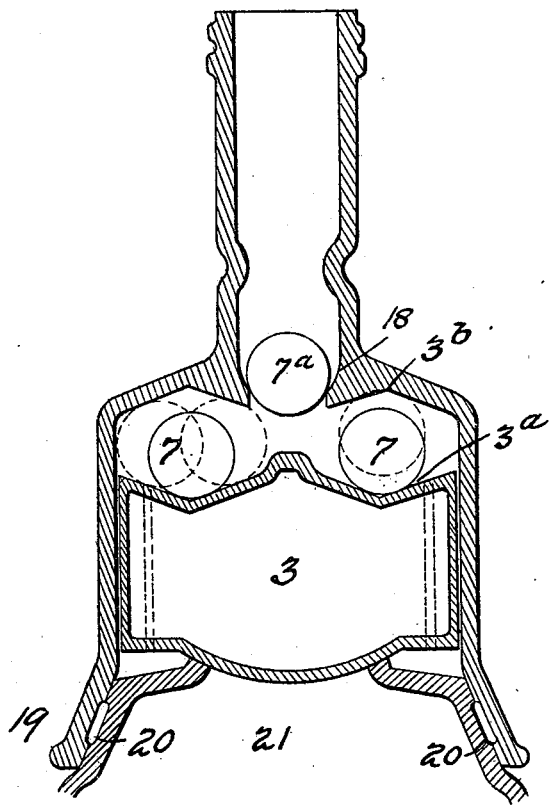
Attest
Walter Donaldson
O. Missaver.
Inventor
Gaston Ragot
Theophile Berlize
by Richards & Co.
Attys

UNITED STATES PATENT OFFICE.

GASTON RAGOT AND THEOPHILE BERLIZE, OF BRUSSELS, BELGIUM.

BOTTLE OR OTHER VESSEL.

SPECIFICATION forming part of Letters Patent No. 637,415, dated November 21, 1899.

Application filed December 19, 1898. Serial No. 699,752. (No model.)

*To all whom it may concern:*

Be it known that we, GASTON RAGOT and THEOPHILE BERLIZE, engineers, residing at Brussels, in the Kingdom of Belgium, have invented Improvements in or Relating to Bottles or other Vessels, of which the following is a specification.

Our invention has for its object to provide a vessel for delivering liquid—such, for example, as a bottle, flask, or jar—which cannot be refilled after it has been once emptied and which cannot be made to receive any further addition of liquid.

Our invention is shown in the accompanying drawing, in which a vertical sectional view is represented.

A hollow cylindrical float 3 is provided with grooves in its sides, as represented in dotted lines, said grooves running from the top to the bottom of the float. The upper surface of the hollow float is provided with an annular channel or groove $3^a$ of angular cross-sectional shape, and in this groove balls 7 7 are located. The shoulder of the bottle is provided internally with a circular groove $3^b$ of angular cross-sectional shape, the apex of the angle being opposite and directed oppositely to that of the groove $3^a$. The recess or channel thus formed by these angular grooves receives the balls 7 7.

The liquid from the bottle flows out along the sides of the float 3 and through the grooves extending in the sides thereof. The liquid thence passes over the float 3 and thence out through the opening 18. About this opening there is a seat, upon which rests a ball $7^a$. This ball prevents the introduction of a tool which might be used in attempting to engage and tamper with the float 3 by keeping it raised for the purpose of introducing liquid fraudulently.

The balls 7 7 prevent the introduction of liquid under pressure, because by reason of this pressure they are forced against the sides of the grooves $3^a$ of the float. In this way they keep the float 3 against its seat. This arrangement is contained in a sheath or casing which forms the neck of the bottle and the shoulders and which ends in an annular edge 19. The whole is fixed at 20 by means of cement upon a vessel-body 21.

We claim—

In combination, the cylindrical float having the groove around its top forming a raised center and edges, a ball in said groove, a casing having a groove $3^b$ for the ball reversed to that in the float, the neck and the ball seated therein, substantially as described.

In witness whereof we have hereunto set our hands in presence of two witnesses.

GASTON RAGOT.
    THEOPHILE BERLIZE.

Witnesses:
 HENRI RACLOT,
 MODESTE LÉONARD.